United States Patent [19]

Eckberg

[11] Patent Number: 4,576,999

[45] Date of Patent: Mar. 18, 1986

[54] ULTRAVIOLET RADIATION-CURABLE SILICONE RELEASE COMPOSITIONS WITH EPOXY AND/OR ACRYLIC FUNCTIONALITY

[75] Inventor: Richard P. Eckberg, Round Lake, N.Y.

[73] Assignee: General Electric Company, Waterford, N.Y.

[21] Appl. No.: 375,676

[22] Filed: May 6, 1982

[51] Int. Cl.[4] .............................................. C08F 283/00
[52] U.S. Cl. .................................. 525/476; 549/215; 528/15; 528/31; 528/25; 525/474; 525/479; 556/445; 556/451; 556/462; 556/450
[58] Field of Search ................... 549/215; 528/25, 31, 528/15; 525/474, 479, 476; 556/445, 450, 451, 462

[56] References Cited

U.S. PATENT DOCUMENTS

| | | | |
|---|---|---|---|
| 2,956,044 | 10/1960 | Merker | 260/46.5 |
| 3,219,624 | 11/1965 | Cohen | 549/215 |
| 3,238,227 | 3/1966 | Tinsley et al. | 260/348 |
| 3,300,418 | 1/1967 | Andres et al. | 528/31 |
| 3,650,811 | 3/1972 | Nordstrom et al. | 117/93.31 |
| 3,650,812 | 3/1972 | Nordstrom et al. | 117/93.31 |
| 3,650,813 | 3/1972 | Nordstrom et al. | 117/93.31 |
| 3,761,444 | 9/1973 | Mendicino | 549/215 |
| 3,814,730 | 6/1974 | Karstedt | 260/46.5 |
| 3,816,282 | 6/1974 | Viventi | 204/159.13 |
| 3,887,487 | 6/1975 | Camp et al. | 549/215 |
| 4,046,930 | 9/1977 | Johnson et al. | 427/387 |
| 4,070,526 | 1/1978 | Colquhoun et al. | 428/537 |
| 4,083,856 | 4/1978 | Mendicino | 260/348.41 |
| 4,127,460 | 11/1978 | Gasko et al. | 204/159.13 |
| 4,156,035 | 5/1979 | Tsao et al. | 427/44 |
| 4,157,357 | 6/1979 | Mine et al. | 528/31 |
| 4,184,004 | 1/1980 | Pines et al. | 428/413 |
| 4,195,030 | 3/1980 | Deichert et al. | 260/448.2 E |
| 4,201,808 | 5/1980 | Cully et al. | 428/40 |
| 4,208,503 | 6/1980 | Martin | 528/14 |
| 4,252,933 | 2/1981 | Sumida | 549/215 |
| 4,279,717 | 6/1981 | Eckberg et al. | 204/159.13 |
| 4,293,678 | 10/1981 | Carter et al. | 528/32 |
| 4,319,811 | 3/1982 | Tu et al. | 351/166 |

Primary Examiner—Melvyn I. Marquis

[57] ABSTRACT

Epoxy- and/or acrylic-functional polysiloxanes are disclosed which, when combined with onium salt photoinitiating catalysts or free-radical photoinitiating catalysts, or both, form ultraviolet radiation-curable release coating compositions which render surfaces non-adherent to other surfaces which would normally adhere thereto. The compositions will cure to such an adhesive state upon brief exposure to ultraviolet radiation. Cure and substrate adhesion may be enhanced by the addition of epoxy monomers where onium salt photocatalysts are included. Preparation of the polymers, coating compositions, catalysts and catalyst blends are also disclosed.

8 Claims, No Drawings

ULTRAVIOLET RADIATION-CURABLE SILICONE RELEASE COMPOSITIONS WITH EPOXY AND/OR ACRYLIC FUNCTIONALITY

This invention relates to organosiloxane polymers and curable compositions made therefrom. More particularly, it relates to organopolysiloxane compositions having epoxy and/or acrylic functionality, and to ultraviolet radiation-curable release coatings made therefrom which render a normally adherent surface relatively abhesive.

BACKGROUND OF THE INVENTION

Silicone compositions have long been used as release coatings, which render a surface or material relatively non-adherent to other materials which would normally adhere thereto. For example, silicone release compositions have found application as coatings which release pressure-sensitive adhesives for labels, decorative laminates, transfer tapes, etc. Silicone release coatings on paper, polyethylene, Mylar ® and other such substrates are also useful to provide non-stick surfaces for food handling and industrial packaging.

Previously developed silicone release compositions, such as those described in copending U.S. application Ser. No. 267,091, filed May 22, 1981 and now U.S. Pat. No. 4,340,647 and U.S. application Ser. No. 359,480, filed Mar. 18, 1982, now abandoned, have been heat curable, but silicone resins which can be cured with ultraviolet radiation are desirable.

Ultraviolet radiation (UV) is one of the most widely used types of radiation because of its low cost, ease of maintenance, and low potential hazard to industrial users. Typical curing times are much shorter, and heat-sensitive materials can be safely coated and cured under UV radiation where thermal energy might damage the substrate.

Several UV-curable silicone systems are known: U.S. Pat. Nos. 3,816,282 (Viventi); 4,052,059 (Bokerman et al.); and 4,070,526 (Colquhoun) describe compositions wherein ω-mercaptoalkyl substituted polysiloxanes react with vinyl-functional silixones in a free-radical process when exposed to UV radiation. These compositions, however, often require scarce or expensive starting materials, have unserviceably slow cure rates, or emit offensive odors (associated with the mercaptan group) which persist in the cured products.

UV-curable silicone resins with epoxy or acrylic functionality have been found recently to have the high degree of reactivity to make them suitable for release applications while avoiding the disadvantages of known UV-curable systems. Epoxy silicone compositions, such as described in U.S. Pat. No. 4,279,717 (Eckberg et al.), are especially advantageous for their rapid curing in the presence of certain onium salt photoinitiators. Acrylic-functional polymers, disclosed in U.S. application Ser. No. 239,297, filed Mar. 2, 1981, now U.S. Pat. No. 4,348,454, can be cured to abhesive coatings under UV radiation in the presence of various free-radical-type photoinitiators.

The above-mentioned U.S. patents and applications are all incorporated herein by reference.

SUMMARY OF THE INVENTION

It has now been discovered that silicone release coating compositions having special advantages in terms of ease and economy of synthesis, extremely rapid cure rate, variety of suitable photoinitiators and both epoxy and acrylic functionality may be obtained.

Accordingly, it is an object of this invention to provide a method of improving the UV cure rate of epoxy-functional silicone release compositions.

It is a further object of this invention to provide silicone polymers exhibiting both epoxy and acrylic functionality.

It is a further object of this invention to provide a novel method of preparing epoxy-functional silicone polymers.

It is a further object of this invention to provide a novel method for preparing acrylic-functional silicone polymers.

It is a further object of this invention to provide silicone release compositions which are ultraviolet radiation-curable in the presence of a variety of photoinitiators.

It is a further object of this invention to provide novel photoinitiator systems for epoxy- and/or acrylic-functional silicone release compositions which will allow very fast curing on exposure to ultraviolet radiation.

These and other objects are accomplished herein by a polyorganosiloxane containing units of the formula:

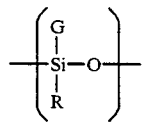

where R is H or $C_{(1-3)}$ alkyl and G is, independently, $C_{(1-3)}$ alkyl, an epoxy-functional organic radical of from 2 to 20 carbon atoms, or an acrylic-functional organic radical of from 2 to 20 carbon atoms, with at least one polymer unit being epoxy- or acrylic-functional.

Another feature of the present invention includes UV-curable silicone release compositions comprising silicone compounds exhibiting acrylic or epoxy functionality, or both, and a catalytic amount of a photoinitiator comprising an onium salt cationic photoinitiator or a silicone-soluble free-radical photoinitiator, or a mixture thereof.

Another feature of the present invention includes the addition of reactive diluents, such as epoxy monomers, to the release compositions herein to enhance the cure of the compositions.

Also contemplated herein is the preparation or synthesis of the aforementioned compositions and of certain novel precursors of the compositions.

DETAILED DESCRIPTION OF THE INVENTION

The epoxy-functional, acrylic-functional and epoxy-and-acrylic-functional silicones of the instant invention are best prepared by stepwise addition of functional groups to silane or siloxane fluids via processes and from precursor materials described hereinafter in detail. The resulting silicone resins can then be cured by dissolving a suitable photoinitiator (or combination of photoinitiators) in the resin and exposing them to ultraviolet radiation. The resins harden to a tack-free, smear-free condition, usually in from one second to ten minutes, and in preferred features of this invention less than one second.

U.S. Pat. No. 4,279,717 (Eckberg et al.) describes the addition of a vinyl epoxide monomer to a methylhydrogen silicone polymer fluid. While this is a proven means of obtaining epoxy-functional silicones, there are drawbacks associated with the nature and availability of the vinyl epoxy monomer starting materials. Many unsaturated aliphatic epoxides, such as 1-butene-3,4-epoxide and allylglycidyl ether, are suspected carcinogens; and 4-vinylcyclohexeneoxide, the preferred starting material of the above-mentioned Eckberg et al. patent, is now unavailable commercially.

The necessity of working with dangerous materials can be eliminated by a feature of the invention herein which is a method of preparing the β-(3,4-epoxy cyclohexyl)ethyl-substituted silicone fluids preferred for paper release applications from non-epoxy starting materials.

It is known in the art that terminal olefins add silicon hydrides more readily than do internal olefins. See, Speier, J. L., Webster, J. A., and Barnes, G. H., *Journal of the American Chemist Society*, 79, 974(1957). From this it was discovered that many diolefins, such as 4-vinylcyclohexene could undergo addition, to ≡SiH-functional fluids in the following manner, similarly to the addition of 4-vinylcyclohexeneoxide described in the Eckberg et al. patent:

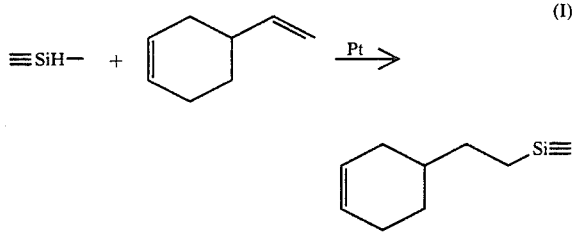

In this manner β-(3,4 cyclohexenyl)ethyl-functional dimethyl silicone fluids are synthesized which can subsequently be epoxidized to yield β-(3,4 epoxy cyclohexyl)ethyl-functional silicone fluids which are known and very desirable for release coating uses.

These ethyl cyclohexenyl-substituted silicone fluids are epoxidized by contact with any of several reagents commonly used to convert olefins to epoxides. For the purposes herein, organic peracids having the general formula RCO.O.OH, where R is a monovalent hydrocarbon radical of from 1 to 20 carbon atoms, are suitable to accomplish the desired epoxidation, which may be represented as follows:

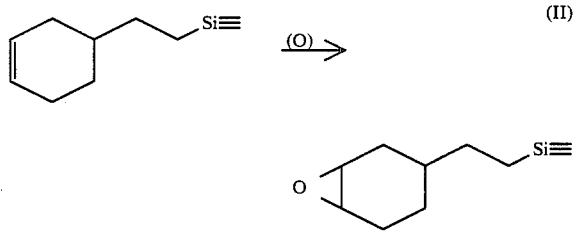

Other epoxidation agents, such as organic hydroperoxides, may also be used. Peracetic acid (40%) and tetrabutylhydroperoxide are preferred.

The foregoing two step process is a novel means of producing β-(3,4 epoxy cyclohexyl)ethyl silicone fluids which can be combined with catalytic onium salts (described infra) and thereafter cured to abhesive coatings by brief exposure to ultraviolet radiation.

In this manner other inexpensive and readily available diolefins, including vinylnorbornene, cyclooctadiene, vinylcyclopentene, allylcyclohexene, and the like can be used to produce organopolysiloxane polymers having unsaturated sites which are easily and safely epoxidized. The resulting epoxy-functional silicones are UV-curable in the presence of onium salts and are useful as paper release compositions.

Another feature of the present invention is the discovery of other epoxy-functional silicone fluids which, though structurally different, are of comparable performance and attractiveness as release compositions to β-(3,4-epoxy cyclohexyl)ethyl silicones. These compositions are prepared from readily available epoxide starting materials and so avoid a major drawback of previously known epoxy-functional release compositions.

The epoxy-functional polydiorganosiloxane silicone fluids provided by the present invention are more specifically dialkylepoxy-chainstopped polydialkylalkylepoxysiloxane copolymers wherein the polysiloxane units contain lower alkyl substituents, notably, methyl groups. The epoxy functionality is obtained when certain of the hydrogen atoms on the polysiloxane chain of a polydimethyl-methylhydrogensiloxane copolymer are reacted in a hydrosilation addition reaction with other organic molecules which contain both ethylenic unsaturation and epoxide functionality. Ethylenically unsaturated species will add to a polyhydroalkylsiloxane to form a copolymer in the presence of catalytic amounts of a precious metal catalyst. Such a reaction is the cross-linking mechanism for other silicone compositions, however, in the present invention, a controlled amount of such cross-linking is permitted to take place in a silicone precursor fluid or intermediate, and this is referred to as "pre-crosslinking". Pre-crosslinking of the precursor silicone fluid means that there has been partial cross-linking or cure of the composition and offers the advantages to the present invention of enabling swift UV-initiated cure with little expense for energy and elimination of the need for a solvent.

The ultraviolet-curable epoxy-functional silicone intermediate fluid comprises a pre-crosslinked epoxy functional dialkylepoxy-chainstopped polydialkyl-alkylepoxy siloxane copolymer fluid which is the reaction product of a vinyl- or allylic-functional epoxide and a vinyl functional siloxane cross-linking fluid having a viscosity of approximately 1 to 100,000 centipoise at 25° C. with a hydrogen-functional siloxane precursor fluid having a viscosity of approximately 1 to 10,000 centipoise at 25° C. in the presence of an effective amount of precious metal catalyst for facilitating an addition cure hydrosilation reaction between the vinyl-functional cross-linking fluid, vinyl-functional epoxide, and hydrogen-functional siloxane precursor fluid.

The vinyl- or allyl-functional epoxides contemplated are any of a number of aliphatic or cycloaliphatic epoxy compounds having olefinic moieties which will readily undergo addition reaction to ≡SiH-functional groups. Commercially obtainable examples of such compounds include 1-methyl-4-isopropenyl cyclohexeneoxide (limoneneoxide; SCM Corp.); 2,6-dimethyl-2,3-epoxy-7-octene (SCM Corp.) and 1,4-dimethyl-4-vinylcyclohexeneoxide (Viking Chemical Co.). Limoneneoxide is preferred.

The precious metal catalyst for the hydrosilation reactions involved in the present invention may be selected from the group of platinum-metal complexes which includes complexes of ruthenium, rhodium, palladium, osmium, iridium and platinum.

In the present invention, the vinyl-functional siloxane cross-linking fluid can be selected from the group consisting of dimethylvinyl chain-stopped linear polydimethylsiloxane, dimethylvinyl chain-stopped polydimethyl-methylvinyl siloxane copolymer, tetravinyltetramethylcyclotetrasiloxane and tetramethyldivinyldisiloxane. The hydrogen functional siloxane precursor fluid can be selected from the group consisting of tetrahydrotetramethylcyclotetrasiloxane, dimethylhydrogen-chainstopped linear polydimethylsiloxane, dimethylhydrogen-chainstopped polydimethyl-methylhydrogen siloxane copolymer and tetramethyldihydrodisiloxane.

The UV-curable acrylic-functional silicone release compositions of the present invention exhibit a desirable combination of properties: their syntheses are high-yield and utilize commercially available and relatively inexpensive inputs, they are shelf stable, and they undergo rapid cure when exposed to UV light in the presence of free-radical photoinitiators to form coatings with good release performance.

Acrylic-functional silicones have been described in U.S. Pat. Nos. 2,956,044 (Merker); 3,650,811; 3,650,812 and 3,650,813 (Nordstrom et al.) but have not provided compositions suitable for the purposes herein. The Merker process utilizes chloromethyl-substituted organosilanes or silicones which are prepared by halogenation of methylsilicones, or by reacting halosilanes with Grignard reagents followed by hydrolysis. These processes are difficult and costly to adapt to large-scale productions, making chloromethyl silicone starting materials scarce and their subsequent acrylation impractical. The Nordstrom syntheses involve reacting ω-hydroxyalkylacrylates or methacrylates with silanol or alkoxy-containing polysiloxanes in the presence of condensation catalysts. Release compositions prepared according to these processes were unacceptably slow-curing and showed poor adhesion to substrates.

Experimental work herein with hydrosilation addition of ethylenically unsaturated acrylic-functional compounds, although affording UV radiation-curable compositions, likewise did not provide acceptable materials for the purposes of this invention. Acrylate or methacrylate esters of the formula:

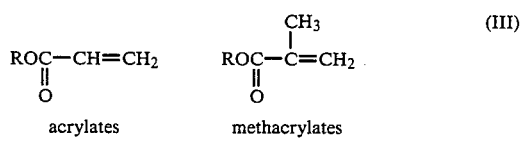

acrylates     methacrylates where R is ethylenically unsaturated, will react with ≡SiH-containing polymers over a platinum catalyst. However, because the acrylic group is itself a site of unsaturation, cross-linking occurs easily, as follows (R' is saturated):

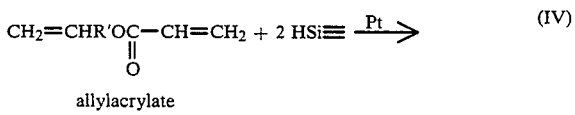

allylacrylate

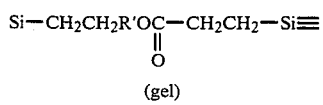

(gel)

In trials, a solid gel often resulted from hydrosilation.

It was determined that addition at the allyl site was kinetically favored, leading to trials which employed a twofold molar excess of the allylacrylate ester to preferentially derive an essentially uncrosslinked product having free acrylic sites. Although a high yield of fluid product was obtained, and the fluid had acceptable UV cure performance with a free-radical photoinitiator, the toxicity of the acrylate and methacrylate esters was seen as a major drawback. The esters are toxic by ingestion and give off highly irritating vapors. In addition, they are not readily available, expensive, and because of precautionary/safety measures entailed by their use, they would be expensive and impractical to adapt to industrial applications.

UV-curable acrylic-functional silicone compounds were also prepared herein via treatment of epoxy-functional silicones with acrylic acid, based on the well-known ability of many acids to open the oxirane ring. Accordingly, acrylic-functional silicones were prepared by reacting acrylic acid with an epoxy-silicone prepared by hydrosilation addition of 2,6-dimethyl-2,3-epoxy-7-octene to an ≡SiH-containing fluid (See Examples 5 and 9, infra). This reaction can be illustrated as follows:

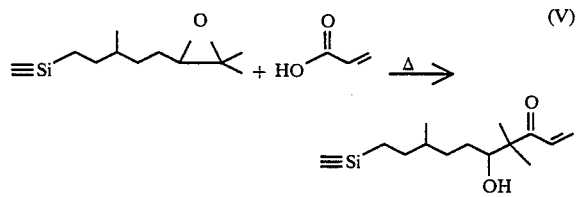

UV-curable release grade acrylic-functional polysiloxanes may be prepared in this manner; however, syntheses using these expensive epoxy-functional monomers, which are themselves UV-curable and within the scope of this invention, are regarded as inefficient.

The preferred acrylic-functional silicone compositions of the present invention are prepared by a stepwise process comprising (1) hydrosilation addition of an alkene halide to a ≡SiH-containing polymer, followed by (2) reaction of the product with an OH-containing acrylate or methacrylate monomer, as illustrated below:

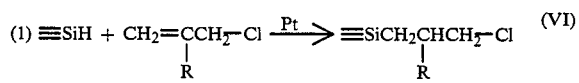

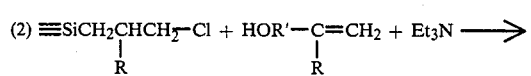

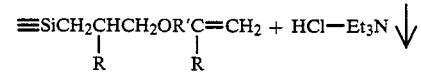

In the above formula, R is hydrogen or methyl and R' has been found to be limited, in the preparation of acrylic-functional silicones of this invention, to

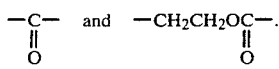

Hence, the acrylate inputs in the preferred process for preparing acrylic-functional silicones must be selected from acrylic acid, methacrylic acid, hydroxyethylacrylate, and hydroxyethylmethacrylate. Acrylic acid is preferred. Also, as indicated by the formulae, the alkene halides suitable for these syntheses are limited to allylchloride and methallylchloride. Methallylchloride is preferred. This method of preparing hydrolytically stable acrylic silicones has been disclosed in U.S. appl. Ser. No. 239,297, filed Mar. 2, 1981, now U.S. Pat. No. 4,348,454.

Acrylic-functional silicones produced according to this stepwise process offer the advantages of inexpensive starting materials, adaptability to large-scale operation and storage stability. The latter property is due to the separation of the acrylic function from direct bonding with silicon by one or more carbon atoms: Hydrolysis in the presence of water would be a side-effect of acrylation of silicon halides, as illustrated below.

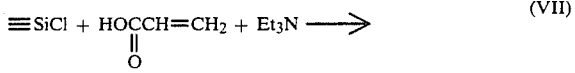 (VII)

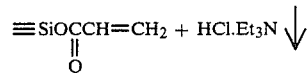

The product of (VII) would be prone to hydrolysis:

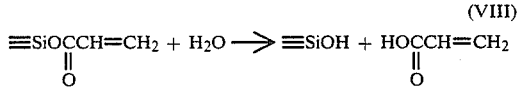 (VIII)

UV-curable acrylic-functional silicone compositions can be made by combining the above-described acrylic-functional silicones with a catalytic amount of a free-radical-type photoinitiator which will effectively initiate crosslinking or self-condensing of the acrylic groups contained in the composition. Such free-radical photoinitiators include, among others, benzoin ethers, α-acyloxime esters, acetophenone derivatives, benzil ketals, and ketone amine derivatives. Preferred examples of these photoinitiators include ethyl benzoin ether, isopropyl benzoin ether, dimethoxyphenyl acetophenone and diethoxy acetophenone.

Epoxy-functional silicones can be made UV-curable by combination with a catalytic amount of an onium salt photoinitiator. Suitable photoinitiators for epoxy-silicone compositions are the onium salts having the formulae:

$R_2I^+MX_n^-$ $R_3S^+MX_n^-$ $R_3Se^+MX_n^-$ $R_4P^+MX_n^-$ $R_4N^+MX_n^-$ where radicals represented by R can be the same or different organic radicals from 1 to 30 carbon atoms, including aromatic carbocyclic radicals of from 6 to 20 carbon atoms which can be substituted with from 1 to 4 monovalent radicals selected from $C_{(1-8)}$ alkoxy, $C_{(1-8)}$ alkyl, nitro, chloro, bromo, cyano, carboxy, mercapto, etc. and also including aromatic heterocyclic radicals including, e.g. pyridyl, thiophenyl, pyranyl, etc.; and $MX_n^-$ is a non-basic, non-nucleophilic anion, such as $BF_4^-$, $PF_6^-$, $AsF_6^-$, $SbF_6^-$, $SbCl_6^-$, $HSO_4^-$, $ClO_4^-$, and the like.

Bis-diaryl iodonium salts, such as bis(dodecyl phenyl)iodonium hexafluoroarsenate and bis(dodecyl phenyl) iodonium hexafluoroantimonate, are preferred.

The amount of catalyst employed is not critical, so long as proper polymerization is effected. As with any catalyst, it is preferable to use the smallest effective amount possible; for the purposes herein, catalyst levels of from about 1%–5% by weight have been found suitable.

The silicone compositions having both epoxy and acrylic functionality which are contemplated by the present invention are not crosslinked mixtures of discrete epoxy and acrylic monomers or prepolymers, rather the epoxy and acrylate (or methacrylate) groups are bonded to the same siloxane chain in a linear silicone polymer. The compositions contain units having the general formula:

 (IX)

where R is hydrogen or $C_{(1-3)}$ alkyl and G is, independently, $C_{(1-3)}$ alkyl, an epoxy-functional organic radical of from 2 to 20 carbon atoms, or an acrylic-functional organic radical of from 2 to 20 carbon atoms. Epoxy-functional organic radicals may be linear or cyclic including, for example, alkylhexeneoxides. As with the acrylic-functional silicones described previously, the acrylic units of the present dual-functional polymers may be formed in several ways and are most storage stable when the acrylic moiety is separated from the siloxane chain by one or more carbons.

Preferred epoxy- and acrylic-functional polysiloxanes are terpolymers having all of the following polymeric units in the same molecule:

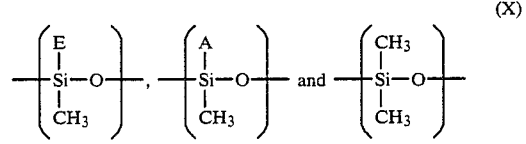 (X)

where E signifies an epoxy-functional radical and A signifies an acrylic-functional radical. The most preferred terpolymer has the formula:

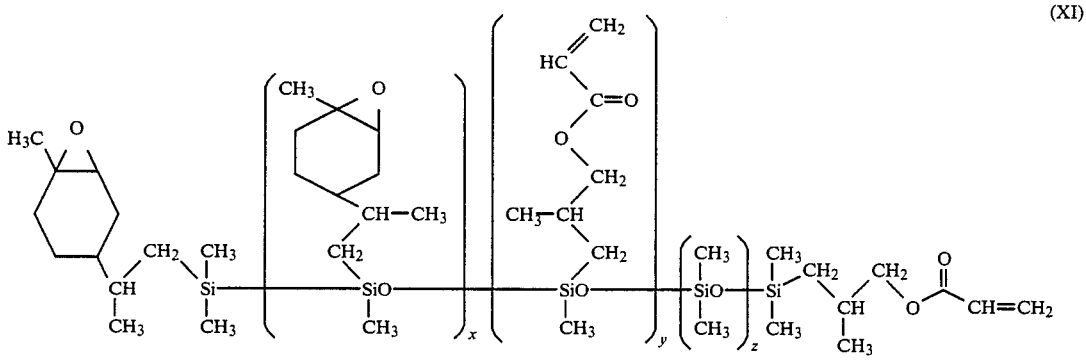

where x, y and z are positive integers from 1 to 1,000.

The epoxy-acrylic-functional polysiloxanes of the present invention are best prepared by hydrosilation addition of an epoxy-functional compound to a ≡SiH-containing silicone polymer, followed by hydrosilation addition of an ω-halogen-containing olefin, followed by acrylate substitution at the halogen site in the presence of pyridine to yield the desired dual-functional polymer having pyridine hydrochloride precipitate.

It is desirable to monitor the level of ≡SiH-functionality during the synthesis so that the separate epoxy addition and halo-olefin addition will both have the necessary reactive sites on the silicon chain. This also allows control of the ratio of epoxy-functionality to acrylic-functionality. For example, by allowing 75% of the reactive ≡SiH sites to be substituted with epoxy groups, and substituting the remainder with an acrylic function, a 3-1 molar ratio of epoxy-functionality to acrylic-functionality can be obtained. This becomes important in view of the curing characteristics of these functional groups, described in detail below.

Suitable epoxy-functional compounds for use in the preparation of the dual-functional polysiloxanes contemplated herein, include all of the epoxy monomers discussed previously. Limoneneoxide is preferred.

In forming the reactive halogen site on the siloxane polymer (for later acrylate addition), any ω-halogen-containing olefin which will undergo hydrosilation and subsequently react with sources of acrylic-functionality is contemplated. These include allylbromide, 6-iodo-n-hexene, methallylchloride, and the like. Methallylchloride is most preferred.

Sources of acrylic functionality suitable for the preparation of the dual-functional polymers herein are hydroxyfunctional acrylates, such as 2-hydroxyethylacrylate, pentaerythritol triacrylate, acrylic acid, methacrylic acid, 2-hydroxyethylmethacrylate, and the like. Acrylic and methacrylic acid are preferred.

The epoxy- and acrylic-functional silicones of the present invention can be cured to abhesive release coatings when exposed to ultraviolet radiation in the presence of catalytic amounts of the aforementioned onium salt catalysts, or the aforementioned free-radical photoinitiators, or (most preferably) both types of photoinitiators. It has been found that not only will the dual-functional polymers of this invention cure more rapidly when combined with a dual catalyst system, but compositions having only epoxy functionality show faster cure and improved release characteristics when cured in the presence of both cationic onium salt photoinitiators and free-radical-type photoinitiators.

Cure of the dual-functional siloxane polymers can be enhanced or controlled by judicious blending of the catalysts and control of the UV exposure time. For example, rapid complete cure of the terpolymer compositions evidently requires both the onium salt photoinitiator and the free radical photoinitiator. It follows that terpolymer compositions can be partially crosslinked by employing one photoinitiator without the other, leaving reactive epoxy or acrylate functionality present for other chemical processes of interest. Simple experimentation with the levels of catalyst and specific catalysts used will direct persons skilled in this area to the optimum photoinitiator(s) for a particular use.

Cure performance and adhesion of the epoxy-containing compositions described herein may also be enhanced by the addition of epoxy monomers to the compositions. For example, addition of up to 10 parts of an aliphatic epoxy monomer for every 10 parts epoxysilicone fluid results in compositions exhibiting superior UV cure and anchorage on porous cellulosic paper as compared to epoxysilicone fluids without these "reactive diluents".

The epoxy monomers, which are simply mixed with the silicone polymer compositions before application to a substrate, include olefinic epoxy monomers such as limoneneoxide, 4-vinylcyclohexeneoxide, allylglycidyl ether, 7-epoxy-1-octene, vinylcyclohexenedioxide, bis(2,3-epoxycyclopentyl)ether, 3,4-epoxycyclohexylmethyl-3,4-epoxycyclohexanecarboxylate, cresylglycidyl ether, butanedioldiglycidyl ether and the like. Mixtures of such epoxides are also suitable. The reactive diluents should be soluble in the epoxysilicone fluid/photoinitiator release composition, and judicious pairing of the polymeric epoxy functionality and epoxy monomer allows tailoring of performance to particular situations. For the purposes herein, where the epoxysilicone functionality is derived from limoneneoxide, preferred epoxy monomer reactive diluents are ω-epoxy $C_{(8-11)}$ aliphatic hydrocarbons. A mixture of such monomers is available commercially as Vikolox ®11–14 (Viking Chemical).

The UV-curable epoxy- and/or acrylic-functional silicone compositions of the present invention can be applied to cellulosic and other substrates including paper, metal, foil, glass, polyethylene coated Kraft paper (PEK), supercalendered Kraft paper (SCK), polyethylene films, polypropylene films and polyester films. A photo-initiated reaction will cure the epoxy- and/or acrylic-functional silicone compositions of the present invention to form an abhesive surface on the coated substrate. Inerting of the cure environment may be necessary with free-radical curing, since oxygen tends to inhibit this type of reaction.

In order that persons skilled in the art may better understand the practice of the present invention, the following examples are provided by way of illustration, and not by way of limitation.

EXAMPLES 1-3

Synthesis of β-(3,4 epoxy cyclohexyl)ethyl silicone fluids from 4-vinylcyclohexene

Sample 1

33 parts by weight of vinylcyclohexene, 33 parts by weight of a 150 cps. dimethylvinyl-chainstopped polydimethylsiloxane fluid and 0.05 parts by weight of a platinum catalyst (chloroplatinic acid-octyl alcohol complex) were dissolved in 300 parts by weight hexane. 300 parts by weight of a polydimethyl-methylhydrogen siloxane copolymer (135 cps. viscosity) containing 7.3% methylhydrogen siloxy units, was slowly added to the stirring hexane solution. This reaction mixture was then refluxed at 73° C. for 4 hours. 10 parts hexene were added, and the reflux continued 16 hours more. A clear, 500 cps. β-(3,4-cyclohexenyl)ethyl-functional fluid product was obtained after stripping the solvent and unreacted vinylcyclohexene and hexene at 110° C. under a vacuum.

Sample 1E (epoxidized)

200 parts by weight of the Sample 1 product were dissolved in 800 parts by weight dichloromethane and cooled to 3° C. 40 parts by weight of 40% peracetic acid in acetic acid solution with potassium acetate buffer (FMC Corp.) was added slowly to the stirring cooled solution. An exothermic reaction ensued which raised the reaction mixture's temperature approximately 20° C. The mixture was stirred, after addition of the peracid was completed, for an additional 18 hours at room temperature. The resulting solution was then shaken with sodium bicarbonate and anhydrous magnesium sulfate, filtered, and the filtrate shaken with an equal volume of a 4% aqueous KOH solution. The organic phase was collected, treated with anhydrous magnesium sulfate and filtered. Solvent was stripped off under vacuum at 75° C. to yield approximately 130 parts by weight of a clear, 600 cps. viscosity fluid (about a 60% yield).

Sample 2

75 parts by weight of 4-vinylcyclohexene, 15 parts by weight of a dimethylvinyl-chainstopped polydimethyl siloxane fluid (150 cps.) and 0.05 parts by weight platinum catalyst were dissolved in 300 parts by weight toluene. 300 parts by weight of a 95 cps. polydimethyl-methylhydrogen siloxane fluid containing 9.9% methylhydrogen siloxy units were slowly added to the toluene solution, the complete reaction mixture being then refluxed at 115° C. for 4 hours. 10 parts by weight hexene were added, and the reflux continued 16 hours more until no unreacted SiH groups were detected by infrared analysis. This β-(3,4-cyclohexenyl)ethyl-functional fluid in toluene product was stored over anhydrous magnesium sulfate.

Sample 2E (epoxidized)

220 parts by weight of the Sample 2 product were combined with approximately 610 parts by weight of toluene. 0.27 parts by weight hexacarbonyl molybdenum (Alfa Inorganic Chemicals) and 0.4 parts by weight dibasic anhydrous sodium phosphate (NaHPO₄) were added and the reaction mixture heated to reflux temperature at 110° C., at which point 100 parts by weight of an anhydrous 40% solution of tetrabutylhydroperoxide (TBHP)* was slowly added over one hour to the refluxing, stirring reaction mixture. The mixture was refluxed for another hour, then cooled to 30° C. 40 parts by weight anhydrous sodium sulfite were added and the reaction mixture stirred overnight. The product solution was filtered and the toluene removed under a vacuum at 60° C. to yield about 120 parts by weight of a clear, amber-colored, 700 cps. β-(3,4-epoxy cyclohexyl)ethyl siloxane fluid (approximately 90% yield).

*Preferred by azeotropic distillation of a mixture of commercially available 70% aqueous TBHP (Aldrich Chemical Company) and toluene. The water is extracted so as not to interfere with the epoxidation reaction.

Infrared examination of Samples 1E and 2E confirmed that the epoxidation of unsaturated sites had taken place. This was further confirmed in that they cured readily when exposed to UV light in the presence of onium salt catalysts, as reported below.

Sample 3 (preparation of Eckberg et al. U.S. Pat. No. 4,279,717 patent)

A control sample of β-(3,4-epoxy cyclohexyl)ethyl-functional silicone fluid was prepared by the conventional hydrosilation addition of 4-vinylcyclohexeneoxide to a ≡SiH-functional fluid. This sample was prepared in the same fashion as Sample 2, except that an equimolar amount of 4-vinylcyclohexeneoxide was substituted for 4-vinylcyclohexene in the synthesis. The above epoxy-functional samples were evaluated for UV cure:

1.5 parts by weight of bis(dodecylphenyl)iodonium hexafluoroantimonate catalyst were mixed with 100 parts by weight of the experimental Samples 1E, 2E and 3. The samples were then coated onto 40-pound supercalendered Kraft (SCK) paper with a doctor blade. The coated papers were exposed to UV-radiation in a PPG UV Processor housing 2 Hanovia medium pressure mercury UV lamps, each generating 200 watts/in.² focused power. Cure was determined by qualitatively noting the presence and extent of smear and migration in the silicone coatings.

Rub-off occurs when a silicone coating fails to adhere to the substrate and can be rubbed off in little balls of cured silicone by gentle finger pressure. Smear is detected in an incompletely cured coating when a finger firmly pressed across the silicone film leaves an obvious permanent streak. Migration is detected by the Scotch ® cellophane tape test. The coating is considered well cured and migration-free if a piece of No. 610 Scotch ® tape will stick to itself after having been first firmly pressed into the silicone coating, then removed and doubled back on itself. If a silicone coating is shown to be migration-free by means of the Scotch ® tape test, it is considered to be a release coating because it adheres to the substrate with an adhesive force much greater than the adhesive force between the cured composition and the released aggressive Scotch ® tape. These qualitative tests are universally employed to ascertain the completeness of cure in silicone paper release coatings.

Smear- and migration-free silicone coatings were considered cured to good release surfaces. Results of the UV evaluation are noted below:

| Sample | UV Exposure (sec) | Smear | Migration |
|---|---|---|---|
| 3 | 0.3 | none | none |
| 3 | 0.1 | slight | moderate |

-continued

| Sample | UV Exposure (sec) | Smear | Migration |
| --- | --- | --- | --- |
| 1E | 0.6 | none | none |
| 1E | 0.3 | slight | slight |
| 2E | 0.3 | none | none |
| 2E | 0.1 | slight | none |
| 2 | 10.0 | (no cure) | (no cure) |

It can be seen from these results that the epoxy silicones synthesized according to the present invention have the same cure performance as epoxy silicones prepared using vinylcyclohexeneoxide.

EXAMPLES 4–6

Synthesis of novel epoxy-functional polysiloxanes from epoxy monomers

Sample 4

130 parts by weight of a 250 cps dimethylvinyl-chainstopped polydimethylsiloxane fluid, 700 parts by weight of limoneneoxide (SCM Corp.), and 1 part by weight of a platinum-octyl alcohol complex were added to 4000 parts by weight of toluene. 2600 parts by weight of a 150 cps dimethylhydrogen-chainstopped polydimethyl-methylhydrogensiloxane copolymer fluid containing 8.7 weight percent $\equiv$SiH groups were added slowly to the stirring mixture at 26° C. over 1 hour. The reaction mixture was then refluxed at 120° C. for 6 hours, at which point 580 parts by weight of n-hexene were added and refluxing continued for 10 hours more. The solvents were removed by heating under a vacuum to yield an 800 cps fluid product containing about 17 weight percent limoneneoxide and 0.8 weight percent unreacted $\equiv$SiH groups.

Sample 5

20 parts by weight of the vinyl-containing siloxane fluid of Sample 4, 40 parts by weight of 2,6-dimethyl-2,3-epoxy-7-octene (DMEO; SCM Organics) and 0.05 parts by weight of the platinum catalyst used in Sample 4 were added to 200 parts by weight toluene. 150 parts by weight of a 95 cps dimethylhydrogen-chainstopped polydimethyl-methylhydrogen siloxane copolymer fluid containing 9.5 weight percent $\equiv$SiH groups were added slowly to the stirring toluene solution. The complete reaction mixture was refluxed at 115° C. for 15 hours, at which point 10 parts by weight hexene were added and the refluxing continued for 5 more hours. Less than 0.6 weight percent unreacted $\equiv$SiH was detected. The solvents were stripped to yield a clear 300 cps epoxysilicone fluid product containing about 19 weight percent functionalized DMEO.

Sample 6

5 parts by weight of the vinyl-containing fluid used above, 0.05 parts by weight of the platinum catalyst and 12 parts by weight 1,4-dimethyl-4-vinylcyclohexeneoxide (DVCO; Viking Chemical Co.) were added to 100 parts by weight hexane. 50 parts by weight of the 90 cps methylhydrogen fluid of Sample 5 were added slowly to the toluene solution. The complete reaction mixture was then refluxed for 6 hours, at which point 5 parts by weight hexene were added and refluxing continued for 15 hours more. The toluene and excess hexene were stripped to yield a clear 280 cps fluid product containing about 18 weight percent DVCO.

Samples 4, 5 and 6 are each "precrosslinked" polydimethyl-methylalkyl (epoxy) siloxane linear polymers, chainstopped by dimethyl-alkyl (epoxy) siloxy groups. These fluids are clearly different in structure from the $\beta$-(3,4-epoxycyclohexyl)ethyl-substituted polysiloxanes described above. The three samples were combined with 1.5 weight percent of bis(dodecylphenyl)iodonium hexafluoroantimonate cationic photoiniator and coated onto polyethylene Kraft (PEK) paper, supercalendered Kraft (SCK) paper and Mylar ®, then exposed to UV radiation in a PPG model 1202 AN UV Processor housing two Hanovia medium pressure mercury UV lamps, each generating 200 watts/in$^2$ focused power to evaluate cure performance. The exposed films were evaluated for rub-off, smear, migration and release properties using techniques well known to persons familiar with release coating technology.

All the coatings cured to smear- and migration-free abhesive surfaces on all substrates in from 0.1 to 0.3 seconds UV exposure time, and none exhibited appreciable rub-off.

Laminates were prepared on silicone-coated SCK substrates by 0.3 seconds UV exposure followed by 6 mil coatings of an SBR rubber adhesive (No. 4950; Coated Products, Inc.) cured on top of the silicone layer. A second sheet of uncoated SCK paper was firmly pressed onto the adhesive layer. Release performance was tested by pulling the SCK-SBR lamina from the SCK-silicone lamina at a 180° angle at 400 feet/min. The force required to separate two inch wide strips of the two lamina were recorded, and the following results observed:

| Sample | Release (grams) |
| --- | --- |
| 4 | 70–90 |
| 5 | 50–80 |
| 6 | 60–85 |

Aging of these laminates for 4 weeks at 140° F. did not significantly effect release performance.

EXAMPLE 7

Synthesis of epoxy-functional silicone from vinylnorbornene

Vinylnorborneneoxide (VNBO) was prepared via epoxidation of a vinylnorbornene (VNB) following the procedure of U.S. Pat. No. 3,238,227 (Tinsley). 14.2 parts by weight of VNBO were combined with 100 parts by weight of a 95 cps dimethylhydrogensiloxy-chainstopped linear polydimethyl-methylhydrogensiloxane copolymer fluid containing 6.25 weight percent $\equiv$SiH groups and a small amount of a platinum catalyst (chloroplatinic acidoctyl alcohol complex). The reaction mixture was then refluxed in 100 parts by weight hexane for 18 hours. Solvents were stripped off under a vacuum to yield a 385 cps epoxysilicone fluid. No unreacted $\equiv$SiH groups were detected on infrared analysis.

As a control, an epoxy-functional silicone fluid was prepared in the above fashion, except that 4-vinylcyclohexeneoxide (VCHO) was used instead of VNBO.

10 parts of each of the two fluids were mixed with 0.2 parts each of bis(dodecylphenyl)iodonium hexafluoroantimonate photoinitiator, then coated onto 40-pound supercalendered Kraft (SCK) paper with a doctor blade. The SCK sheets were exposed to UV radiation on a PPG model 1202 AN Processor housing 2 Hanovia medium pressure mercury lamps each operating at 300 watts/in² focused power for approximately 0.5 second. Both coatings cured to smear- and migration-free abhesive surfaces.

Release performance of the coatings was determined by preparing laminates of epoxysilicone-coated SCK sheets with 10 ml films of Gelva ®263 (Monsanto) aggressive acrylic adhesive. Release testing was carried out using a Scott tester as described above, with the following results:

| Silicone Coating | Release (grams) |
| --- | --- |
| VNBO | 90-100 |
| Control (VCHO) | 30-40 |

Release in the 100-gram range against an aggressive adhesive is considered excellent performance. From these results it can be seen that VNBO is an alternative to VCHO as a starting material for epoxy-functional silicone release compositions, because it may be readily prepared from commercially-available vinylnorbornene.

EXAMPLE 8

500 parts by weight of a 70 cps dimethylhydrogen-chainstopped linear polydimethyl-methylhydrogen siloxane copolymer fluid were dissolved in 500 parts by weight toluene. 126 parts by weight limoneneoxide and 25 parts by weight of a 3000 cps dimethylvinyl-chainstopped linear polydimethyl siloxane fluid were then added. The reaction mixture was catalyzed with 0.2 parts by weight of a platinum catalyst, then refluxed for 18 hours. Unreacted ≡SiH groups were removed by reaction with hexene. Excess hexene and toluene were stripped under a vacuum at 150° C. to yield 581 parts by weight of a 660 cps epoxy-functional silicone fluid.

20 parts by weight of the above product were dispersed in 80 parts by weight hexane with 0.3 parts by weight bis(dodecylphenyl)iodonium hexafluoroantimonate. This composition was coated onto 40-pound SCK stock with a No. 2 wire-wound rod, and then immediately exposed to UV radiation as described in Example 7. A smear- and migration-free adhesive surface was obtained after approximately 0.3 seconds. 0.5–0.6 pounds per ream of the silicone were coated onto substrate in this fashion. Release performance of this thin, even film was determined against a 5 mil coating of aggressive SBR adhesive as described in Sample 6. Results for several determinations were each less than 50 grams.

COMPARATIVE EXAMPLES A–D

Synthesis of prior art acrylic-functional silicones (Nordstrom et al., U.S. Pat. No. 3,650,811)

Sample A 81 parts by weight of a β-(tris(ethoxy)silyl)ethyl-chainstopped linear polydimethyl siloxane fluid prepared by hydrosilation addition of vinyltriethoxysilane to a dimethylhydrogen-chainstopped dimethyl fluid were mixed with 6 parts by weight hydroxyethyl acrylate, 0.1 parts by weight tetraisopropyltitanate and 0.5 parts by weight hydroquinone. This reaction mixture was heated, with stirring, to 140° C. After 3 hours, generation of 1.58 hours by weight ethanol was observed. The reaction mixture was stirred at 100° C. under a vacuum to provide a hazy yellow 280 cps fluid product. The generation of ethanol indicates that at least partial acrylation of the siloxane fluid had occurred.

This composition was tested for release performance by mixing 5 parts by weight of the fluid product with 0.2 parts by weight of a benzoin ether photoinitiator (Trigonal 14 ®; Noury Chemical Corp.). This material was coated on SCK paper and exposed to a single H3T7 mercury vapor UV source in a nitrogen atmosphere at 6 inches until a smear-free cured surface was obtained (about 1 min. exposure time). The cured film was smear-free and migration-free, but was easily rubbed off of the substrate.

Sample B 56 parts by weight of a dimethylhydrogen-chainstopped linear polydimethyl-methylhydrogen siloxane fluid containing 12 weight percent ≡SiH units and 0.05 parts by weight of a platinum catalyst (chloroplatinic acid-octyl alcohol complex) were dissolved in 200 parts by weight benzene. 10 parts by weight allylacrylate were added to this solution, and the reaction mixture was refluxed for 3 hours. At this point the reaction mixture rapidly increased in viscosity and a solid, useless gel was obtained.

Sample C 35 parts by weight of allylacrylate and 0.05 parts by weight of a platinum catalyst [grade 88257] were dissolved in 150 parts by weight hexane. 100 parts by weight of methylhydrogen fluid containing 17.6 weight percent ≡SiH units was added slowly to the stirring hexane solution. The complete reaction mixture was heated to reflux (80° C.). An intractable solid gel formed within 1 your, and the reactants were discarded.

Sample D: (Molar excess of acrylic monomer)

37 parts by weight allylacrylate and 0.05 parts by weight of a platinum catalyst [grade 88034] were dissolved in 200 parts by weight toluene. 100 parts by weight of a methylhydrogen copolymer containing 9.9 weight percent ≡SiH groups were added slowly to the stirring solution. The complete reaction mixture was heated to 65° C. for 10 hours, then to 85° C. for 6 hours, at which point no unreacted ≡SiH groups could be detected by infrared spectroscopy. The solvent and excess allylacrylate were stripped off under a vacuum to yield 120 parts by weight of a 443 cps fluid product.

A release coating composition was prepared by adding 4 weight percent diethoxyacetophenone to the above product. This was coated as a thin film onto SCK substrates and cured as in Example 7, requiring 6 seconds' UV exposure. The resulting cured surface exhibited little or no smear or migration, but was easily rubbed off of SCK substrates.

EXAMPLE 9

Acrylation of epoxy silicones 100 parts by weight of a 450 cps epoxy silicone copolymer incorporating 16 weight percent 2,6-diemthyl-2,3-epoxy-7-octene (Sample 5, above) were dissolved in 200 parts by weight toluene with 15 parts by weight acrylic acid. The reaction mixture was heated to 115° C. under nitrogen for 90 minutes. Toluene and excess acrylic acid were stripped off under a vacuum to yield 98 parts by weight of a hazy amber 633 cps fluid. The higher viscosity of the product is an indication that the opening of the oxirane ring occurred.

These reactions can be represented as:

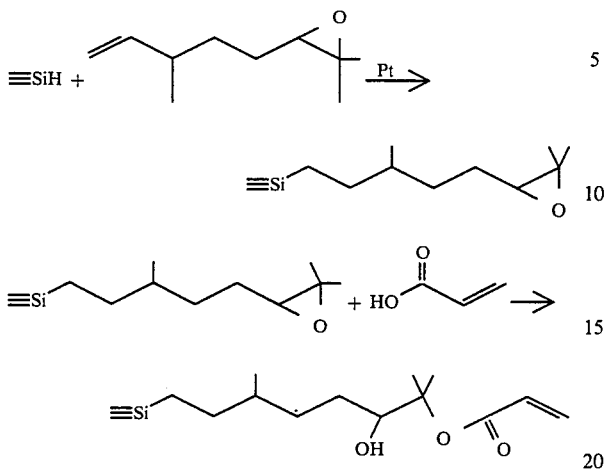

Similar materials are disclosed in U.S. Pat. No. 4,293,678 (Carter, et al.), but the epoxy function is specifically limited to allylglycidyl ether or vinylcyclohexeneoxide adducts. The instant example demonstrates that preparation of a range of different acrylic-functional compounds is possible.

10 parts by weight of this product were mixed with 0.4 parts by weight diethoxyacetophenone photoinitiator and the mixture applied to SCK paper with a doctor blade. The coating cured to a smear- and migration-free adhesive surface after 7.5 seconds exposure in a PPG processor housing two medium pressure mercury vapor ultraviolet lamps each operating at 300 watts/in.$^2$.

EXAMPLES 10–14

2-step synthesis of acrylic-functional silicones

Sample 10

35 parts by weight of allylchloride were dissolved in 300 parts by weight hexane with 0.05 parts by weight of a platinum catalyst [grade 88257]. 300 parts by weight of an 80 cps linear methylhydrogen silicone fluid containing 8.5 weight percent ≡SiH groups were added to the hexane solution. This mixture was refluxed at 70° C. for 20 hours, at which point no ≡SiH-functionality was detected. Hexane and excess allylchloride were removed under a vacuum to yield a 100 cps fluid containing γ-chloropropyl substitution. 150 parts by weight of this material were stirred with 15 parts by weight acrylic acid and 21 parts by weight triethylamine at 100° C. for 30 minutes under nitrogen. Stripping unreacted materials and filtering off the amine-hydrochloride provided a hazy fluid product of 620 cps viscosity.

Sample 11

50 parts by weight allylchloride, 40 parts by weight vinyl-chainstopped silicone fluid with 0.05 parts by weight platinum catalyst were dispersed in 15 parts by weight toluene. 500 parts by weight of a methylhydrogen silicone fluid containing 6.2 weight percent ≡SiH groups were added to the toluene solution, which was refluxed for 4 hours. Excess allylchloride was removed under a vacuum, along with sufficient toluene to increase the solids content of the product to about 50% by weight. 19 parts by weight of β-hydroxyethylacrylate were added to 308 parts by weight of the product, followed by very slow addition of pyridine. Stripping and filtering the product yielded a 500 cps fluid.

Sample 12

This sample was prepared as in Sample 11, except that 2-hydroxyethylmethacrylate was substituted for 2-hydroxyethylacrylate in the synthesis to yield a methacrylate-functional silicone product.

Sample 13

This sample was prepared as in Sample 11, except that all processing was carried out in 1 reaction vessel.

Sample 14

60 parts by weight methallylchloride and 0.05 parts by weight of a platinum catalyst were dissolved in 200 parts by weight toluene. 200 parts by weight of a 95 cps methylhydrogen silicone fluid containing 9.9 weight percent ≡SiH groups were added slowly to the toluene solution. The reaction mixture was refluxed for 15 hours, at which point no reactive ≡SiH groups were detected. Excess methallylchloride was removed under vacuum, then 24 parts by weight acrylic acid and 33 parts by weight triethylamine were consecutively added to the reaction vessel. Following addition of the amine, the reaction mixture was heated to 113° C. for 1 hour, then stripped and filtered. A clear yellow 217 cps fluid product was obtained.

The examples were combined with small amounts of free-radical photoinitiators, coated on SCK paper substrates and cured in an inert atmosphere to give cured adhesive coatings. The cure performance is summarized as follows:

| Sample | Acrylic Function | Photoinitiator | Cure Time (sec) |
|---|---|---|---|
| 10 | —CH$_2$CH$_2$CH$_2$OOCH=CH$_2$ | 5% Trigonal 14 | 3.0 |
| 11 | —CH$_2$CH$_2$CH$_2$OCH$_2$CH$_2$OOCCH=CH$_2$ | " | 1.5 |
| 12 | —CH$_2$CH$_2$CH$_2$OCH$_2$CH$_2$OOCC(CH$_3$)=CH$_2$ | " | 5.0 |
| 13 | —CH$_2$CH$_2$CH$_2$OCH$_2$CH$_2$OOCCH=CH$_2$ | 4% DEAP | 1.5 |
| 14 | —CH$_2$CH(CH$_3$)CH$_2$OOCCH=CH$_2$ | " | 1.5 |

The release performance was determined against a 6 mil coating of aggressive SBR adhesive as described previously. Cured films of the above samples had release values of 40–80 grams, which is considered "premium" release.

EXAMPLES 15 AND 16

Preparation of epoxy-acrylic-functional polysiloxanes

Sample 15

An epoxy- and acrylic-functional silicone terpolymer was prepared as follows:

200 parts by weight of a 300 cps dimethylhydrogen-chainstopped linear polydimethyl-methylhydrogen siloxane copolymer fluid containing 8 weight percent methylhydrogen siloxane units were added to a reaction vessel. 40 parts by weight limoneneoxide and 0.1 parts by weight of a platinum catalyst (U.S. Pat. No.

3,814,730 (Karstedt), incorporated herein by reference) were added, along with 240 parts by weight toluene. This reaction mixture was refluxed for 16 hours. Infrared analysis showed 2.5 weight percent methylhydrogen siloxy units remained unreacted. Approximately 11.16 parts by weight methallylchloride were added, and refluxing resumed for 30 minutes, at which time no unreacted ≡SiH groups were detected. Excess methallylchloride was removed by distillation. 6 parts by weight acrylic acid were then added to the reaction vessel, followed by slow dropwise addition of 8 parts by weight pyridine to the stirring solution. A hazy precipitate formed as the pyridine was added. Solvent and excess amine were removed under a vacuum at 150° C. 206 parts by weight of a 2970 cps fluid were obtained. Analysis revealed that 11.7 weight percent limoneneoxide and 3.35 weight percent acrylic acid functionality were included in the polymer composition. The foregoing synthesis can be illustrated as follows.

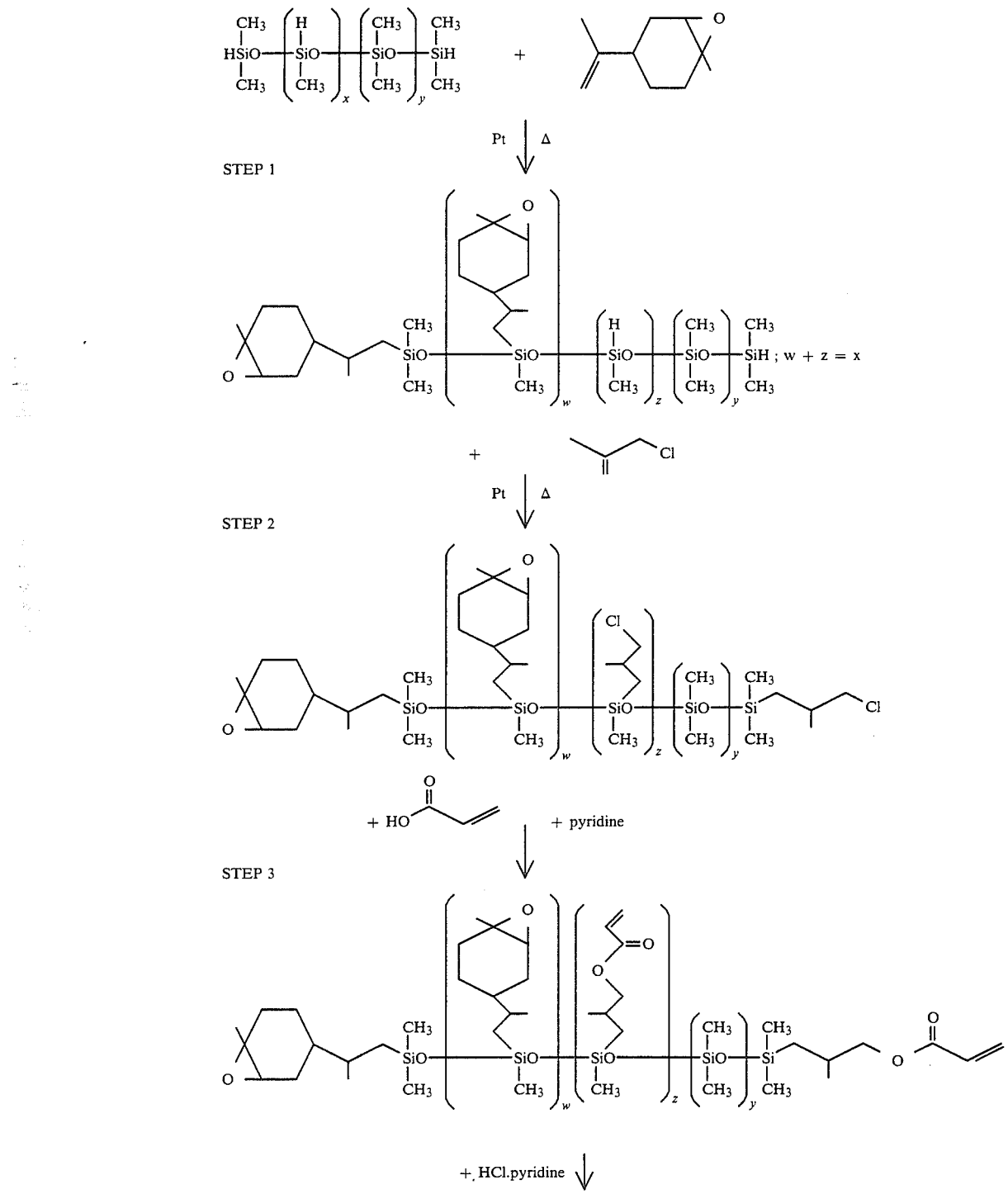

Sample 16

200 parts by weight of a 90 cps dimethylhydrogen-chainstopped polydimethyl-methylhydrogen siloxane copolymer fluid containing 10.5 weight percent methylhydrogen siloxy units were dispersed in 250 parts by weight toluene. 53 parts by weight limoneneoxide and 0.1 parts by weight of the Karstedt catalyst (Example 15) were then added. The reaction mixture was refluxed for 16 hours. Consecutive reactions of methallylchloride and acrylic acid/pyridine as described in Example 15 yielded a 560 cps terpolymer fluid containing 16.7 weight percent limoneneoxide-functional units and 3.2 weight percent acrylic-functional units, or on oxirane/acrylic molar ratio of 3.9/1.

Three release coating compositions were prepared using Sample 16, as follows:

| Coating | Parts by Weight Terpolymer | Parts by Weight $(C_{12}H_{25}Ph)_2ISbF_6$ | Parts by Weight Diethoxy-acetophenone |
|---|---|---|---|
| 16A | 10 | 0.2 | — |
| 16B | 10 | 0.2 | 0.5 |
| 16C | 10 | — | 0.5 |

These mixtures were coated on 40-pound SCK paper and cured as in Example 9, with the following results:

| Coating | Cure Time (sec) | Description |
|---|---|---|
| A | 0.3 | slight migration |
| B | 0.1 | excellent anchorage |
| C | 0.3 | very poor anchorage |

EXAMPLE 17

200 parts by weight of a 70 cps dimethylhydrogen-chainstopped polydimethyl-methylhydrogen siloxane copolymer fluid containing 10 weight percent $\equiv$SiH groups were added to a reaction vessel. 150 parts by weight toluene, 51 parts by weight limoneneoxide and approximately 0.1 part by weight platinum catalyst were added and the mixture refluxed at 120° C. for 17 hours, at which point 2.08 weight percent $\equiv$SiH functionality remained. 10 parts by weight methallylchloride were added and refluxing resumed for an additional 1½ hours. No unreacted $\equiv$SiH groups were detected. Excess methallylchloride was removed by distilling 50 ml of solvent at atmospheric pressure. The solution was cooled to 30° C. and 5.0 parts by weight of acrylic acid were added, followed by dropwise addition of 14.0 parts by weight of triethylamine. The complete reaction mixture was then stirred for 12 hours at room temperature. The dispersion was filtered and stripped of solvent, amine and low-boiling side products under a vacuum at 150° C. to yield 197 parts by weight of a hazy yellow 440 cps fluid containing an oxirane/acrylate group ratio of 3.4/1.

To test cure performance, three release coatings were prepared using the above product:

| Sample | dual-functional silicone fluid | Photoinitiator PhC:OC(CH$_3$)$_2$OH* | (C$_{12}$H$_{25}$Ph)$_2$ISbF$_6$ |
|---|---|---|---|
| 17A | 10 parts by weight | 0.3 parts by weight | — |
| 17B | 10 parts by weight | — | 0.15 parts by weight |
| 17C | 10 parts by weight | 0.3 parts by weight | 0.15 parts by weight |

*free-radical-type catalyst, available as Darocure ® 1173 (E.M. Chemicals)

Each of the three compositions was coated on 40-pound SCK paper with a doctor blade, then cured using a PPG Model QC1202 UV Processor housing two Hanovia mercury vapor lamps each giving 300 watts/in.$^2$ focused power. The following results were obtained:

| Sample | Exposure Time (sec.) | Remarks |
|---|---|---|
| 17A | 1.5 | slight smear, no migration |
| 17A | 0.3 | smear, no migration |
| 17A | 0.15 | smear, no migration |
| 17A | 0.08 | not cured |
| 17B | 0.15 | no smear, slight migration |
| 17B | 0.08 | not cured |
| 17C | 0.08 | no smear, no migration, excellent anchorage |

Release performance of this polymer was tested by preparing coating baths as follows:

| Bath | Silicone Fluid | Photoinitiator PhC:OC(CH$_3$)$_2$OH | (C$_{12}$H$_{25}$Ph)$_2$ISbF$_6$ |
|---|---|---|---|
| 17D | 20 parts by weight | 0.6 parts by weight | — |
| 17E | 20 parts by weight | — | 0.3 parts by weight |
| 17F | 20 parts by weight | 0.6 parts by weight | 0.3 parts by weight |

8"×10" SCK sheets were coated from the D, E and F baths with a No. 2 wire-wound rod to provide depositions of approximately 0.5 lbs/ream. The sheets were exposed to UV light for 0.3 seconds in a PPG Processor as described above. The cured coatings were then laminated with 5 mil layers of SBR adhesive and a second SCK sheet pressed on to the adhesive layer. 2"×8" strips of the silicon-coated lamina were pulled away from the adhesive lamina at 180° at 400 feet/min. using a Scott tester, which recorded the force (in grams) required to separate the lamina:

| Coating | Release (g) |
|---|---|
| 17D | 460–520 |
| 17E | 320–400 |
| 17F | 130–150 |

From this example it is seen that the degree of cure may be made a function of the type of catalyst employed, and the catalyst blend may be tailored to provide a desired level of release.

EXAMPLES 18–19

Dual Catalyst System For Rapid Curing of Epoxy-Functional Silicones

An epoxy-functional silicone fluid composition containing 80% epoxy-functional fluid having 20 weight percent limoneneoxide reactivity and 20% Vikolox-®11-14 epoxy monomer was used to form the following two release coating compositions:

| Sample | Epoxysilicone + Vikolox 11-14 | Photoinitiator | |
|---|---|---|---|
| | | Diethoxy-acetophenone | $(C_{12}H_{25}Ph)_2ISbF_6$ |
| 18 | 10 parts by weight | — | 0.15 parts by weight |
| 19 | 10 parts by weight | 0.15 parts by weight | 0.15 parts by weight |

The samples were each hand coated on 40-pound SCK sheets and exposed to UV radiation in a PPG Processor housing 2 UV lamps, each operating at 300 watts/in.hu 2 in an air or nitrogen environment. Minimum UV exposure time to achieve smear-free and migration-free abhesive coatings was recorded.

| Sample | Atmosphere | Cure Time (sec.) |
|---|---|---|
| 18 | air | 0.3 |
| 18 | $N_2$ | 0.3 |
| 19 | air | 0.3 |
| 19 | $N_2$ | 0.075 |

Release performance of hand-coated (solventless) specimens was tested using nitrogen-cured samples in laminates prepared with 10 mil layers of Gelva ® (Monsanto) acrylic adhesive. Release at different UV exposure times were recorded on a Scott tester:

| Sample | Release (grams) | | |
|---|---|---|---|
| | 0.3 sec. | 0.15 sec. | 0.08 sec. |
| 18 | 120-140 | 150-175 | 160-190 |
| 19 | 120-140 | 100-130 | 100-130 |

EXAMPLES 20-22

Further trials similar to the Examples 18 and 19 were set up in order to test another free-radical photoinitiator, Trigonal ® 14 (Noury Chemical Co.), a benzoin ether compound. An epoxysilicone-Vikolox ® 11-14 blend similar to that used in Examples 18 and 19 was used.

| Sample | Epoxysilicone Vikolox 11-14 | Photointiator | |
|---|---|---|---|
| | | Trigonal ® 14 | $(C_{12}H_{25}Ph)_2ISbF_6$ |
| 20 | 10 parts by weight | — | 0.15 parts by weight |
| 21 | 10 parts by weight | 0.15 parts by weight | 0.15 parts by weight |
| 22 | 10 parts by weight | 0.15 parts by weight | — |

The samples were coated and cured as in Example 18, with the following results:

| Sample | Atmosphere | Cure Time (sec.) |
|---|---|---|
| 20 | air | 0.6 |
| 20 | $N_2$ | 0.6 |
| 21 | air | 0.6 |
| 21 | $N_2$ | 0.075 |
| 22 | air | >3.0 (no cure) |
| 22 | $N_2$ | >3.0 (no cure) |

EXAMPLES 23-24

A toluene solution of an epoxy-functional silicone fluid was prepared to test benzophenone, a crystalline solid at room temperature, as a free-radical photoinitiator in the dual catalyst system of this invention. 300 parts by weight of an 85 cps dimethyl-methylhydrogen silicone fluid, 99 parts by weight limoneneoxide and 300 parts by weight toluene were mixed and refluxed 20 hours. Unreacted ≡SiH groups were eliminated by reaction with hexene to yield 725 parts by weight of a limonenoxide-functional polysiloxane in toluene. Half this product was stripped of solvent and designated Sample 23. The remainder was treated with 0.32 parts by weight benzophenone, which readily dissolved in the hexane solution. The solvent was then stripped and designated Sample 24. Both samples were diluted with 17 weight percent Vikolox ® 11-14 epoxy monomer as a reactive diluent, bringing the viscosity of the fluid samples to about 225 cps. No evidence of the benzophenone coming out of solution was observed over four months' storage at room temperature.

Samples 23 and 24 were tested for UV curability as in Examples 18-22 after 10 parts by weight of each was combined with 0.2 parts by weight of $(C_{12}H_{25}Ph)_2ISbF_6$; with the following results:

| Sample | Atomosphere | UV Exposure Time (sec.) | Remarks |
|---|---|---|---|
| 23 | air | 0.6 | cured-no smear, no migration |
| 23 | air | 0.3 | smears, migrates |
| 24 | air | 0.6 | cured-no smear, no migration |
| 24 | air | 0.3 | smears, migrates |
| 23 | $N_2$ | 0.3 | smears, migrates |
| 24 | $N_2$ | 0.07 | cured-no smear, no migration |

EXAMPLES 25-28

Trials similar to Examples 23 and 24 were performed to test the efficacy of three other free-radical compounds:

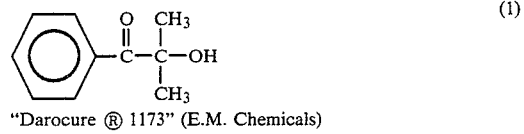

"Darocure ® 1173" (E.M. Chemicals)

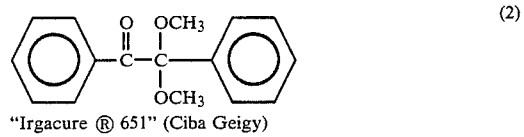

"Irgacure ® 651" (Ciba Geigy)

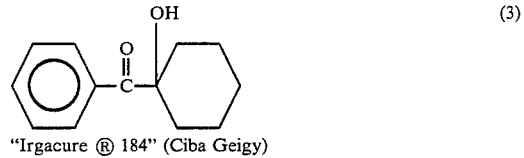

"Irgacure ® 184" (Ciba Geigy)

Four portions of a limoneneoxide-functional silicone fluid (the same limoneneoxide-silicone fluid described in Examples 23-24) in toluene were prepared. To each of three portions were added 0.15 weight percent of Darocure 1173, Irgacure 651 and Irgacure 184, respectively, to form Samples 25, 26 and 27. Sample 28, containing no free-radical photocatalyst was maintained as a control. All four samples were stripped under a vacuum at 150° C. to yield four fluids of approximately 600 cps. No reactive diluents were added in these examples.

Cure performance was tested in the same manner as Examples 23–24. 0.15 parts by weight of bis-dodecylphenyl iodonium hexafluoroantimonate were added to 10 parts by weight of the four samples. After coating on SCK stock and curing in a PPG Processor as described above, the following results were observed:

| Sample | Atmosphere | Exposure Time (sec.) | Remarks |
|---|---|---|---|
| 25 | air | 1.5 | cured-no smear, no migration |
| 25 | air | 0.3 | smear, migration |
| 25 | $N_2$ | 0.075 | cured-no smear, no migration |
| 26 | air | 0.6 | cured-no smear, no migration |
| 26 | air | 0.3 | smear, migration |
| 26 | $N_2$ | 0.15 | cured-no smear, no migration |
| 26 | $N_2$ | 0.075 | smear, migration |
| 27 | air | 0.6 | cured-no smear, no migration |
| 27 | air | 0.3 | smear, migration |
| 27 | $N_2$ | 0.06 | cured-no smear, no migration |
| 28 | air | 0.6 | cured-no smear, no migration |
| 28 | air | 0.3 | smear, migration |
| 28 | $N_2$ | 0.3 | smear, migration |

The cure-enhancing effect of free-radical photoinitiators can be seen to lead to a five to ten-fold improvement in the cure rate when an inert cure environment is present. The faster production benefits made possible by these increased cure rates can make up for the added expense of inerting the curing chambers.

EXAMPLES 29–32

Epoxysilicones enhanced by addition of aliphatic epoxy monomers

An epoxy-functional silicone fluid was prepared in the following manner:

40 parts by weight limoneneoxide were dispersed in 160 parts by weight toluene. To this were added 200 parts by weight of a 170 cps dimethylhydrogen-chainstopped linear polydimethyl-methylhydrogen siloxane copolymer fluid having 8 weight percent ≡SiH groups and 10 parts by weight of a 250 cps dimethylvinyl-chainstopped polydimethyl siloxane fluid. This mixture was catalyzed with 0.05 parts by weight of a platinum catalyst, then refluxed at 120° C. for six hours. Hexene was added to react with the remaining ≡SiH functions, followed by resumption of reflux for 16 hours. Hexene and solvents were stripped under a vacuum to yield 217 parts by weight of a 1730 cps epoxy-functional dimethyl silicone copolymer fluid containing about 14 weight percent limoneneoxide functionality.

This reaction product was combined with varying amounts of an epoxidized α-olefin, Vikolox ®11–14 (Viking Chemical Co.) having the formula:

(XIII)

where n is an integer from 8 to 11. Vikalox 11–14 is a mixture of epoxides of from 11 through 14 carbons. The following coating samples were prepared to examine cure performance:

| Sample | Epoxysilicone | Epoxy Monomer (Vikolox) | $(C_{12}H_{25}Ph)_2ISbF_6$ | Viscosity (cps) |
|---|---|---|---|---|
| 29 | 100 parts by weight | — | 1.5 parts by weight | 1730 |
| 30 | 90 parts by weight | 10 parts by weight | 1.5 parts by weight | 820 |
| 31 | 80 parts by weight | 20 parts by weight | 1.5 parts by weight | 465 |
| 32 | 70 parts by weight | 30 parts by weight | 1.5 parts by weight | 275 |

The samples were coated onto 40-pound SCK paper with a doctor blade, then exposed for 0.3 seconds to UV radiation from two Hanovia medium pressure mercury vapor lamps, each providing 300 watts/in.$^2$ focused power, housed in a PPG 1202 UV Processor, then examined for smear, migration and rub-off:

| Sample | Smear | Migration | Rub-Off |
|---|---|---|---|
| 29 | slight | moderate | severe (rub-off with light pressure |
| 30 | slight | moderate | moderate |
| 31 | slight | slight | slight |
| 32 | slight | slight | none |

Laminates prepared as in previous examples using Gelva ®263 acrylic adhesive (Monsanto) and SCK paper, were cut into 2"×9" tapes, then pulled apart at 400 feet/min. using a Scott tester. The following release data were generated (Adhesive Transfer measures any adhesive sticking to silicone/SCK lamina pulled away):

| Sample | Release (g) | Adhesive Transfer |
|---|---|---|
| 29 | 140–170 | yes |
| 30 | 100–150 | no |
| 31 | 110–140 | no |
| 32 | 120–140 | no |

EXAMPLES 33–37

An epoxysilicone fluid of approximately 9000 cps was prepared as described in Examples 29–32. This material was blended with Vikolox ®12 monomer (epoxidized 1-dodecene) to furnish the following coating compositions:

| Sample | Epoxysilicone | Epoxy Monomer | $(C_{12}H_{25}Ph)_2ISbF_6$ | Viscosity (cps) |
|---|---|---|---|---|
| 33 | 100 parts by weight | — | 1.5 parts by weight | 9000 |
| 34 | 90 parts by weight | 10 parts by weight | 1.5 parts by weight | 4800 |
| 35 | 80 parts by weight | 20 parts by weight | 1.5 parts by weight | 2260 |
| 36 | 70 parts by weight | 30 parts by weight | 1.5 parts by weight | 1140 |
| 37 | 60 parts by weight | 40 parts by weight | 1.5 parts by weight | 610 |

The samples were coated and cured as in Examples 29–32, with the following results:

| Sample | Smear | Migration | Rub-Off |
|---|---|---|---|
| 33 | slight | slight | severe |
| 34 | slight | slight | moderate |
| 35 | very slight | slight | slight |
| 36 | slight | slight | slight |
| 37 | moderate | moderate | trace |

Release performance was tested against an aggressive SBR adhesive in laminates, with the following results:

| Sample | Release (grams) | Adhesive Transfer |
|---|---|---|
| 33 | 40–100 | yes |
| 34 | 40–90 | no |
| 35 | 80–140 | no |
| 36 | 220–270 | no |
| 37 | 370–450 | no |

EXAMPLES 37–39

A 960 cps epoxy-functional silicone fluid was synthesized as described in Examples 29–37. This product was blended with Vikolox®11–14 epoxy monomer, the blends cured and evaluated on 40-pound SCK paper as in previous examples. The results are shown below:

| Sample | Epoxysilicone | Epoxy Monomer | $(C_{12}H_{25}Ph)_2ISbF_6$ | Viscosity cps |
|---|---|---|---|---|
| 37 | 100 parts by weight | — | 1.5 parts by weight | 960 |
| 38 | 90 parts by weight | 10 parts by weight | 1.5 parts by weight | 500 |
| 39 | 80 parts by weight | 20 parts by weight | 1.5 parts by weight | 290 |

| Sample | Smear | Migration | Rub Off | Release (g) |
|---|---|---|---|---|
| 37 | slight | moderate | moderate | 70–100 |
| 38 | none | moderate | slight | 60–90 |
| 39 | none | slight | none | 110–140 |

Coating of solventless silicone release coatings onto rolled substrates by offset rotogravure is best accomplished with fluid viscosities in the range of 300–1000 cps. Also, compositions with acceptable cure, high release values, but no adhesive transfer (see Sample 36) might be useful for controlled release applications. It can be seen from the foregoing data that the use of reactive diluents can be helpful in achieving either or both of the goals of ease of application and controlled release.

EXAMPLES 40–46

A 660 cps limoneneoxide-functional silicone fluid was synthesized as described in the previous 3 sets of examples, then combined with a variety of epoxy monomers as follows:

| Sample | Epoxy-silicone | Epoxy Monomers* | $(C_{12}H_{25}Ph)_2ISbF_6$ |
|---|---|---|---|
| 40 | 10 parts | (none) | 0.15 parts by weight |
| 41 | 8.5 parts by weight | 1.5 parts by weight Vikolox 11–14 | 0.15 parts by weight |
| 42 | 8.5 parts by weight | 1.5 parts by weight CY-183 | 0.15 parts by weight |
| 43 | 8.5 parts by weight | 1.5 parts by weight DY-023 | 0.15 parts by weight |
| 44 | 8.5 parts by weight | 1.5 parts by weight Epoxide 7 | 0.15 parts by weight |
| 45 | 8.5 parts by weight | 1.5 parts by weight Epoxide 8 | 0.15 parts by weight |
| 46 | 8.5 parts by weight | 1.5 parts by weight BDGE | 0.15 parts by weight |

*Vikolox 11–14 (Viking chemical)

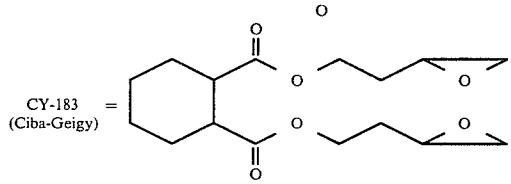

CY-183 (Ciba-Geigy) =

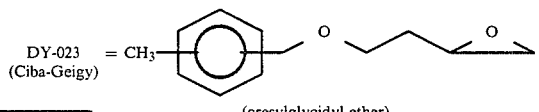

DY-023 (Ciba-Geigy) = (cresylglycidyl ether)

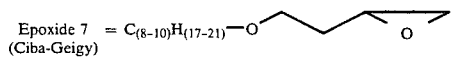

Epoxide 7 (Ciba-Geigy) = $C_{(8-10)}H_{(17-21)}$—O

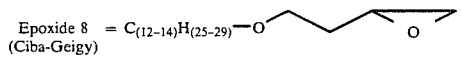

Epoxide 8 (Ciba-Geigy) = $C_{(12-14)}H_{(25-29)}$—O

BDGE = butanedioldiglycidyl ether

The above samples were coated on SCK paper and cured as in previous examples for 0.3 seconds. The following results were observed:

| Sample | Blend Appearance | Cure Performance |
|---|---|---|
| 40 | hazy | slight smear & migration, easily rubbed off substrate |
| 41 | clear | cured-no smear, migration or rub-off |
| 42 | opaque | no cure |
| 43 | opaque | poor cure-smearing, migration |
| 44 | clear | cured-no smear migration or rub-off |
| 45 | clear | cured-no smear migration or rub-off |
| 46 | opaque | no cure |

From Examples 42, 43 and 46 it is seen that the reactive diluents must be miscible with both the epoxy-silicone fluid and the onium salt photocatalyst.

Silicone release coating baths were prepared from the 3 successful coatings above for release performance evaluation, as follows:

| Sample | Epoxysilicone | Diluent | $(C_{12}H_{25}Ph)_2ISbF_6$ | Hexane |
|---|---|---|---|---|
| 40A | 20 parts by weight | none | 0.3 parts by weight | 80 parts by weight |
| 41A | 17 parts by weight | 3 parts by weight | 0.3 parts by weight | 80 parts by weight |

-continued

| Sample | Epoxysilicone | Diluent | $(C_{12}H_{25}Ph)_2ISbF_6$ | Hexane |
| --- | --- | --- | --- | --- |
| 44A | 17 parts by weight | Vikalox 11-14 3 parts by weight Epoxide 7 | 0.3 parts by weight | 80 parts by weight |
| 45A | 17 parts by weight | 3 parts by weight Epoxide 8 | 0.3 parts by weight | 80 parts by weight |

These samples were applied to 40-pound SCK stock with a No. 2 wire-wound rod to give thin, even coating depositions of 0.5-0.6 lb/ream. UV exposure for 0.3 seconds cured all coatings, with 40A showing some rub-off. Laminates were prepared using an aggressive SBR adhesive. 2"×8" strips of the epoxysilicone/SCK lamina were pulled away from the adhesive/SCK lamina at 180° at 400 feet/min., generating the data below:

| Coating | Release (g) | Adhesive Transfer |
| --- | --- | --- |
| 40A | 35-50 | no |
| 41A | 30-45 | no |
| 44A | 30-45 | no |
| 45A | 30-50 | no |

It will be obvious to those skilled in the art that cure and substrate adhesion of acrylic-functional silicones (such as described in Examples 10-14) and dual-functional acrylic-epoxysilicones (such as described in Examples 15 and 16) are also improved by the use of silicone-soluble epoxy monomers, so long as onium salt catalysts (such as $(C_{12}H_{25}Ph)_2ISbF_6$) are included in the coating formulation.

Obviously, modifications and variations in the present invention are possible in light of the foregoing disclosure. It is understood, however, that any incidental changes made in the particular embodiments of the invention as disclosed are within the full intended scope of the invention as defined by the appended claims.

I claim:

1. A process for preparing an organopolysiloxane having epoxy functionality and curable to an abhesive composition on exposure to ultraviolet radiation in the presence of a photoinitiator comprising the steps:
   (1) Reacting a cyclic diolefin with a hydrogen-functional siloxane compound in the presence of a small amount of a precious metal catalyst;
   (2) recovering a cyclic mono-olefin-substituted siloxane and reacting it with an epoxidation agent; and
   (3) recovering an epoxy-functional polysiloxane.

2. A process as defined in claim 1 wherein said epoxidation agent is a peracid RCO.O.OH.

3. A process as defined in claim 2 wherein said peracid is peracetic acid.

4. A process as defined in claim 1 wherein the epoxidation agent is organic hydroperoxide.

5. A process as defined in claim 4 wherein the epoxidation agent is tetrabutylhydroperoxide.

6. A process as defined in claim 1 wherein the diolefin is selected from the group consisting of 4-vinylcyclohexene, vinylnorbornene, cyclooctadiene, vinylcyclopentene and allylcyclohexene.

7. A process as defined in claim 6 wherein the diolefin is 4-vinylcyclohexene and the epoxidation agent is peracetic acid.

8. A process as defined in claim 6 wherein the diolefin is 4-vinylcyclohexene and the epoxidation agent is tetrabutylhydroperoxide.

* * * * *